United States Patent [19]

Tanaka et al.

[11] Patent Number: 5,543,236
[45] Date of Patent: Aug. 6, 1996

[54] MULTI-LAYERED SLIDE BEARING MATERIAL

[75] Inventors: Tadashi Tanaka; Masaaki Sakamoto; Koichi Yamamoto; Koji Kitagawa, all of Nagoya, Japan

[73] Assignee: Daido Metal Company, Ltd., Nagoya, Japan

[21] Appl. No.: 350,012

[22] Filed: Nov. 29, 1994

[30] Foreign Application Priority Data

Dec. 27, 1993 [JP] Japan ................................ 5-332189

[51] Int. Cl.⁶ ........................................... B32B 15/01
[52] U.S. Cl. ........................ 428/614; 428/677; 428/675; 428/645
[58] Field of Search .................... 428/645, 674, 428/677, 614, 675

[56] References Cited

U.S. PATENT DOCUMENTS

| | | | |
|---|---|---|---|
| 2,635,020 | 4/1953 | Beebe, Jr. | 428/645 |
| 3,997,099 | 12/1976 | Morisaki | 228/117 |
| 4,696,867 | 9/1987 | Eastwood | 428/650 |
| 4,877,696 | 10/1989 | Muto | 428/645 |
| 5,156,729 | 10/1992 | Mahrus et al. | 205/104 |
| 5,185,216 | 2/1993 | Tanaka et al. | 428/645 |

FOREIGN PATENT DOCUMENTS

| | | | |
|---|---|---|---|
| 54-23667 | 8/1979 | Japan . | |
| 60-33365 | 2/1985 | Japan | 428/645 |
| 61-186499 | 8/1986 | Japan . | |
| 1463464 | 2/1977 | United Kingdom . | |

OTHER PUBLICATIONS

JPO & Derwent Abstracts for JP 61-186, 499, Aug. 1986.
"Metals Handbook", Ninth edition, vol. 3, TA 472 A3, 1978, pp. 802-822.

Primary Examiner—Ngoc-Yen Nguyen
Attorney, Agent, or Firm—Browdy and Neimark

[57] ABSTRACT

A bearing material is produced by forming a Cu-Pb-system or Pb-bronze-system bearing alloy layer on a steel plate optionally plated with Cu, and forming a Pb alloy overlay containing Zn on the bearing alloy layer so as to enhance corrosion resistance and conformability of the bearing alloy layer. A Cu-Zn alloy layer of 0.5 to 10 µm is present between the Cu matrix of the bearing alloy layer and the overlay. The Cu-Zn alloy layer prevents Sn and In in the overlay from diffusing into the Cu matrix of the bearing alloy layer. The multi-layered slide bearing material can be manufactured by forming the bearing alloy lining layer on the steel plate optionally plated with Cu so as to obtain a bimetal plate, rolling the bimetal plate and a lead alloy plate for the overlay containing Zn to bond the plates in accumulative reduction of 8 to 48%, and thereafter subjecting the plates to heat treatment at 170° to 250° C.

8 Claims, 2 Drawing Sheets

MULTI-LAYERED SLIDE BEARING MATERIAL

BACKGROUND OF THE INVENTION

The present invention relates to a multi-layered slide bearing comprising a steel plate optionally plated with Cu on which a copper-lead-system bearing alloy layer and a lead alloy overlay containing Zn are formed and, more particularly, to a multi-layered slide bearing material including a copper-zinc alloy layer which is interposed between a copper-lead-system or lead-bronze-system bearing alloy layer and a lead alloy overlay containing Zn, and to a method of manufacturing the same.

A slide bearing comprising a steel plate as a backing metal plate on which a copper-lead-system or lead-bronze-system bearing alloy layer is formed has been used as a bearing for high-load application, for example, in an internal combustion engine. Although a slide bearing of this type has an excellent load carrying capacity, it involves problems in other properties required for bearing alloy such as an anti-seizure property, embeddability and conformability. Conventionally, therefore, a lead-tin-system or lead-tin-indium-system overlay has been formed on the surface of a bearing alloy layer so as to improve the anti-seizure property, embeddability and conformability.

JP-B2-54-23667 discloses a method of manufacturing such a multi-layered slide bearing. According to the method, a bimetal plate, which is formed by providing a backing metal plate with a lining of copper-lead-system or lead-bronze-system bearing alloy, and a lead alloy plate, which contains one or more of Sn, Sb, Cu, Zn, Te, In, As, Tl and other additive elements whose amount or total amount is 40% at maximum, and balance of Pb, are prepared. Next, the bimetal plate and the lead alloy plate for an overlay are rolled to bond under a temperature of from a room temperature to 200° C. so that the accumulative reduction is 8 to 40%.

JP-A-61-186499 discloses a method of improving heat resistance of an overlay to enhance the wear resistance at high temperature and to improve the corrosion resistance with respect to lubricating oil whose oxidization is promoted at high temperature. In the method, an overlay is formed on the conventional bearing alloy layer, and the overlay is made of alloy containing 0.5 to 10% Zn, at least one element selected from the group consisting of 0.5 to 25% Sn, 0.1 to 5% Cu, 0.1 to 5% Sb, 0.1 to 5% As and 0.1 to 10% In, and balance of Pb and impurities.

In the above-described multi-layered slide bearing, Sn and In in the overlay improve the wear resistance and the corrosion resistance. However, when the copper-lead-system or lead-bronze-system bearing alloy layer and the overlay are brought into direct contact with each other, Sn and In in the overlay diffuse into the bearing alloy layer. As a result, amounts of Sn and In in the overlay are decreased, thereby deteriorating the wear resistance and the corrosion resistance. Consequently, as described in JP-A- 61-186499, the surface of a copper-lead-system or lead-bronze-system bearing alloy layer is normally plated with Ni, and thereafter formed with an overlay. With this nickel plating layer, Sn and In in the overlay can be prevented from diffusing into the bearing alloy layer.

However, in the case of the multi-layered slide bearing with the nickel plating layer interposed between the bearing alloy layer and the overlay, the nickel plating layer will be exposed when the overlay wears and its thickness decreases. Problems will arise that hard Ni damages the mating shaft, and that corrosion resistance of the bearing alloy layer is degraded due to wear of the nickel plating layer.

SUMMARY OF THE INVENTION

The present invention has been achieved in view of the above-described situations. An objective of the invention resides in providing a multi-layered slide bearing material and a manufacturing method thereof, in which Sn and In in an overlay can be prevented from diffusing into the copper matrix of a bearing alloy layer without employing a nickel plating layer, and there is no fear of damaging a mating shaft and degrading corrosion resistance even if the overlay wears to thinner.

According to a first aspect of the invention, there is provided a material of a multi-layered slide bearing comprising a steel plate optionally plated with Cu, a lining layer of copper-lead-system or lead-bronze-system bearing alloy formed on the steel plate, and a lead alloy overlay containing Zn formed on the bearing alloy lining layer, wherein a copper-zinc alloy layer having a thickness of 0.5 to 10 μm is present between the copper matrix of the bearing alloy lining layer and the lead alloy overlay.

In this case, preferably, the lead alloy overlay consists essentially of, by weight, 1 to 5% Zn, at least one of Sn and In whose amount or total amount is 3 to 25%, and balance of Pb and incidental impurities. The lead alloy overlay may further comprise at least one of Cu and Sb whose amount or total amount of 1 to 13%. Moreover, preferably, the bearing alloy layer consists essentially of, by weight, 3 to 35% Pb, up to 15% Sn, and balance of Cu and incidental impurities.

According to a second aspect of the invention, there is provided a method of manufacturing a material of a multi-layered slide bearing, comprising the steps of forming a lining layer of copper-lead-system or lead-bronze-system bearing alloy on a steel plate optionally plated with Cu so as to obtain a bimetal plate, rolling the bimetal plate and a lead alloy plate for an overlay which contains Zn to bond the plates so that the accumulative reduction will be 8 to 48%, and thereafter subjecting the bonded plates to heat treatment at 170° to 250° C. This heat treatment causes Zn in the overlay to diffuse into the bearing alloy lining layer, and consequently, the copper-zinc alloy layer is formed between the copper matrix of the lining layer and the overlay.

In the multi-layered slide bearing material according to the present invention, the copper-zinc alloy layer is formed between the copper matrix of the copper-lead-system or lead-bronze-system bearing alloy lining layer and the lead alloy overlay so that Sn, In and the like in the overlay do not diffuse into the copper matrix of the lining layer.

Further, on the interface between the bearing alloy lining layer and the overlay, Pb which crystallizes in the copper matrix is not covered with the copper-zinc alloy layer formed by diffusion but is exposed to the overlay. Therefore, Sn and In in the overlay partially diffuse into the lead phase of the lining layer. Even if the overlay wears and the copper-zinc alloy layer and the lining layer are exposed to the environment, Sn and In diffused in the lead phase can maintain corrosion resistance and wear resistance of the copper-zinc alloy layer and the lining layer. Also, the copper-zinc alloy layer is softer than the conventional nickel plating layer so that there is no fear of damaging the mating shaft.

The copper-zinc alloy layer does not produce the intended effect when the thickness is less than 0.5 μm. When the thickness is greater than 10 μm, the copper-zinc alloy layer becomes brittle and tends to peel easily, thereby degrading bonding strength of the overlay with respect to the bearing alloy layer.

DETAILED DESCRIPTION OF THE INVENTION

Figure 1:
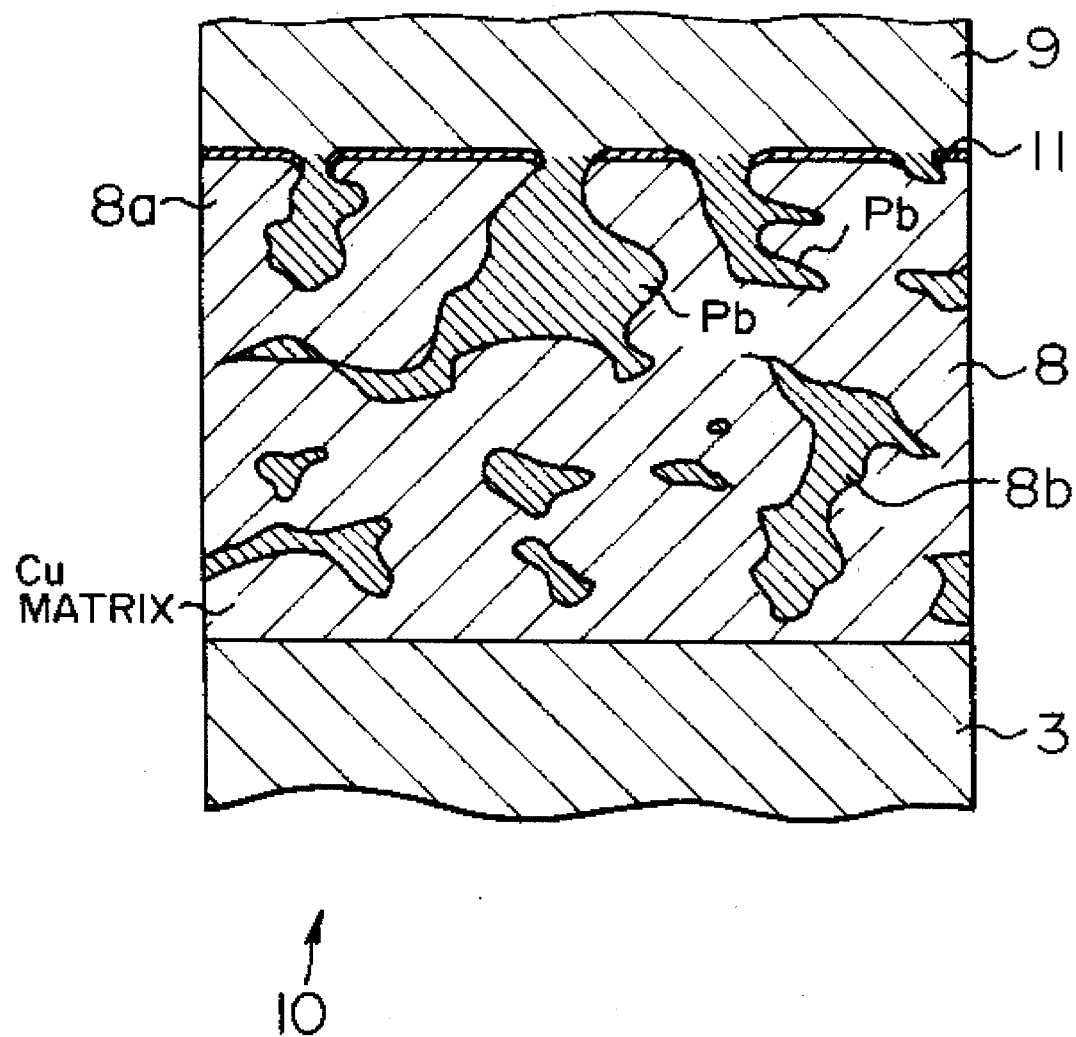
FIG. 1 is a diagram showing the structure of an essential portion of a bearing material.

The composition of the overlay is determined for the following reasons.

(1) Zn: 1 to 5%

When the zinc content is 1% or more, a copper-zinc alloy layer is formed on the interface between the copper matrix of a copper-lead-system or lead-bronze-system bearing lining alloy and the overlay as a result of heat treatment, so as to prevent corrosion-resistant elements in the overlay from diffusing into the copper matrix of the bearing alloy. When the zinc content exceeds 5%, the melting point tends to go down, thereby deteriorating the wear resistance at high temperature and the load carrying capacity.

(2) At least one of Sn and In: 3 to 25%

Sn serves to improve corrosion resistance of the lead matrix with respect to organic acid in lubricating oil, and to improve the wear resistance. When the tin content exceeds 15%, the melting point of the lead matrix goes down, and the wear resistance at high temperature and the load carrying capacity are degraded. In also serves to improve the corrosion resistance and the wear resistance. Addition of In over 15% deteriorates the wear resistance at high temperature and the load carrying capacity owing to lowering of the melting point of the lead matrix. When amount or total amount of Sn and/or In is less than 3%, the effect of improving the corrosion resistance and the wear resistance is not observed. Addition amount or total amount of Sn and/or In over 25% degrades the wear resistance at high temperature and the load carrying capacity.

(3) At least one of Cu and Sb: 1 to 13%

Cu and Sb improve the wear resistance and the fatigue resistance. However, such an effect is not observed when amount or total amount of Cu and/or Sb is less than 1%. When it exceeds 13%, the overlay becomes brittle, thereby deteriorating the conformability.

Next, reasons for determining the composition of copper-lead-system or lead-bronze-system bearing alloy will be described. The copper-lead-system or lead-bronze-system bearing alloy is bearing alloy for high-load application which requires an overlay formed on its surface, and its composition is similar to copper-lead alloy for bearings and lead-bronze alloy for bearings.

(1) Pb: 3 to 35%

Pb improves the conformability and the anti-seizure resistance. Such an effect is not observed when the lead content is less than 3%. When it exceeds 35 %, strength of the copper matrix decreases resulting in deteriorating the fatigue resistance and the corrosion resistance.

(2) Sn: up to 15%

In the lead-bronze-system bearing alloy, Sn dissolves in the copper matrix and improves the wear resistance and the load carrying capacity. When tin content exceeds 15%, the tensile strength decreases, and the elongation decreases resulting in that the bearing alloy becomes brittle.

In order to manufacture a multi-layered slide bearing material according to the invention which has the above-described composition, a layer of copper-lead-system or lead-bronze-system bearing alloy is bonded on a steel plate optionally plated with Cu, thereby obtaining a bimetal plate. The bimetal plate and a lead alloy plate for an overlay which contains Zn are rolled to bond, and thereafter subjected to heat treatment. As a result of the heat treatment, Zn in the lead alloy as the overlay diffuses into the copper matrix of the surface layer of the bearing alloy layer, and a copper-zinc alloy layer is formed on the interface between the bearing alloy layer and the overlay.

When the accumulative reduction is less than 8% during rolling bonding of the bimetal plate and the lead alloy plate for the overlay, bonding strength of the bimetal plate and the lead alloy plate is lowered. When the accumulative reduction exceeds 48%, the bearing alloy layer becomes hard and brittle.

Moreover, when the heat treatment temperature is lower than 170° C., Zn in the lead alloy plate for the overlay does not sufficiently diffuse into the copper matrix of the bearing alloy layer. When the heat treatment temperature exceeds 250° C., Pb oxidizes intensely during the heat treatment.

EMBODIMENT

One embodiment of the present invention will now be described with reference to the attached drawings.

Figure 2:
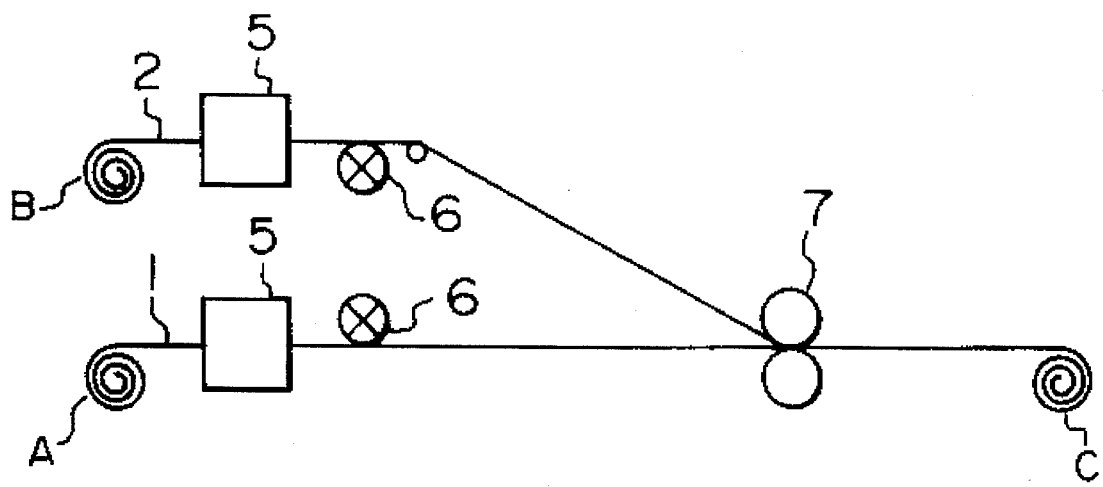
FIG. 2 is a schematic view showing a manufacturing process according to one embodiment of the present invention.

FIG. 2 shows the manufacturing process of a multi-layered slide bearing material, in which a bimetal strip (or plate) 1 and an alloy strip (or plate) 2 to be used as an overlay are coiled and mounted on uncoilers A and B, respectively.

Figure 3:
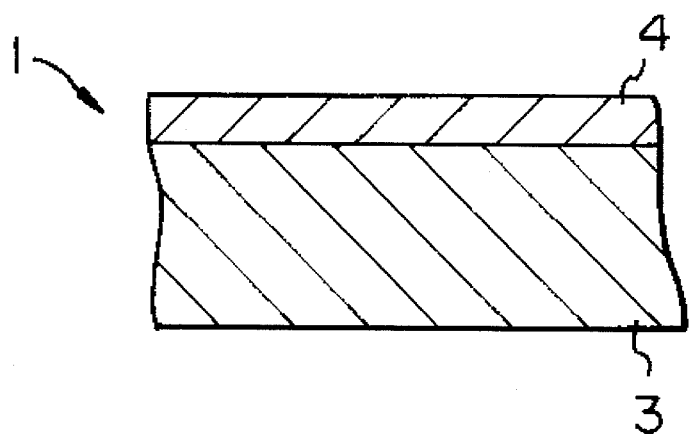
FIG. 3 is a cross-sectional view showing a bimetal strip.

As shown in FIG. 3, the bimetal strip 1 comprises a steel plate 3 optionally plated with Cu to serve as a backing metal plate of a bearing, and copper-lead-system or lead-bronze-system bearing alloy layer 4 to serve as a bearing alloy layer which is bonded on the steel plate 3. The bearing alloy layer 4 has a composition consisting essentially of, by weight, 3 to 35% Pb, up to 15% Sn, and balance of Cu and incidental impurities.

The alloy strip 2 to be used as an overlay is made of alloy consisting essentially of, by weight, 1 to 5% Zn, 3 to 25% of at least one of Sn and In, and balance of Pb and incidental impurities. The alloy may further comprise 1 to 13% of at least one of Cu and Sb.

The bimetal strip 1 and the alloy strip 2 are drawn out from the uncoilers A and B, and degreased and cleaned in decreasing tanks 5, to thereby remove stains from the surfaces of the strips. Then, the strips 1 and 2 are ground by wire brushes 6 so that their surfaces to be bonded will have a certain roughness for promoting the bonding effectiveness.

Next, the strips 1 and 2 are passed through rolls of a rolling machine 7 to be bonded in accumulative reduction of 8 to 48%. It was confirmed that when the accumulative reduction is less than 8%, bonding strength between the bimetal strip 1 and the alloy strip 2 is lowered, and that when the accumulative reduction exceeds 48%, the bearing alloy plate 4 becomes hard and brittle.

When the bimetal strip 1 and the alloy strip 2 are bonded in such manner, a bearing material strip 10 is manufactured, as shown in FIG. 1, in which a lining layer 8 of copper-lead-system or lead-bronze-system bearing alloy (corresponding to the bearing alloy 4) is formed on the steel plate 3 optionally plated with Cu, and a lead alloy overlay 9 containing Zn (corresponding to the alloy strip 2) is formed on the bearing alloy layer 8. Then, the bearing material strip 10 is wound around a coiler C, and thereafter fed into a heat treatment furnace (not shown) in which the bearing material strip 10 is heat treated at 170° to 250° C.

The heat treatment in the furnace causes Zn in the overlay 9 to diffuse into the copper matrix 8a of the bearing alloy layer 8 on the interface between the bearing alloy layer 8 and the overlay 9. Due to the diffusion, a copper-zinc alloy layer 11 having a thickness of 0.5 to 10 μm is formed between the bearing alloy layer 8 and the overlay 9.

Experiments by the inventors of the present application confirmed that when the heating temperature in the above-mentioned heat treatment is less than 170° C., Zn in the overlay does not sufficiently diffuse into the copper matrix 8a of the bearing alloy layer so that the copper-zinc alloy layer 11 having a thickness of 0.5 to 10 μm will not be formed, and that when the heating temperature exceeds 250° C., Pb phase 8b in the bearing alloy oxidizes intensely.

In the bearing material 10 obtained in the above-described manner, the copper matrix (indicated by Cu in FIG. 1) of the bearing alloy layer 8 is covered with the copper-zinc alloy layer 11, and consequently, an amount of diffusion of Sn and In in the overlay 9 into the copper matrix is lessened.

Therefore, a rate of decrease of Sn and In in the overlay 9 is so low that corrosion resistance and wear resistance of the overlay 9 are hardly deteriorated. Thus, durability of the overlay 9 is enhanced.

In the surface layer of the bearing alloy layer 8, the lead phase 8b which crystallizes in the copper matrix is not covered with the copper-zinc alloy layer 11 but exposed to the overlay 9. In consequence, Sn and In in the overlay 9 can diffuse into the lead phase 8b.

Therefore, even if the overlay 9 wears and the copper-zinc alloy layer 11 and the bearing alloy layer 8 are exposed, Sn and In diffused in the lead phase maintain a favorable corrosion resistance. Besides, since the copper-zinc alloy layer 11 is softer than the conventional nickel plating layer, it does not damage the mating shaft.

EXAMPLE

Corrosion tests were performed with regard to invention specimens which included overlays 9 of various compositions shown in Table 1, and comparative specimens. The invention specimens and comparative specimens 1, 3, 4 and 6 were each manufactured by rolling to bond an overlay 9 on a lead-bronze-system bearing alloy layer 8 consisting essentially of, by weight, 23% Pb, 3.5% Sn, and balance of Cu and incidental impurities, and by subjecting this material to heat treatment at 200° C. for four hours.

With the comparative specimens from which overlays or nickel plating layers were removed, and with the invention specimens from which overlays 9 and copper-zinc alloy layers 11 were removed, corrosion tests were conducted in the following manner: The specimens were immersed in deteriorated engine oil (trade name: Shell Rotella Oil) of a motor vehicle after traveling 10,000 km, at 130° C. for 1,000 hours, and differences between their weights before and after the immersion were derived. The test results are shown in Table 1. In this table, the comparative specimens 2 and 5 referred to as "PLATED" indicated by the asterisk (*) were each manufactured by preparing the same bearing alloy layer as the invention specimens, electrically plating it with nickel for preventing diffusion and with an overlay, and subjecting the material to heat treatment at 130° C. for 50 minutes.

TABLE 1

| BEARING | | OVERLAY COMPOSITION (WEIGHT %) | | | | | | COPPER-ZINC ALLOY LAYER | CORROSION LOSS |
|---|---|---|---|---|---|---|---|---|---|
| | | Pb | Zn | Sn | In | Cu | Sb | THICKNESS (μm) | (mg/cm$^2$) |
| COMPARATIVE SPECIMEN | 1 | BALANCE | — | 8 | — | 2.2 | — | NONE | 10.1 |
| | 2(*) | BALANCE | — | 8 | — | 2.5 | — | NONE | 15.6 |
| | 3 | BALANCE | — | 8 | — | 2.2 | 3 | NONE | 15.0 |
| | 4 | BALANCE | — | 9 | 9 | — | — | NONE | 7.9 |
| | 5(*) | BALANCE | — | 9 | 9 | — | — | NONE | 15.4 |
| | 6 | BALANCE | 0.5 | 9 | 9 | — | — | 0.3 | 6.9 |
| INVENTION SPECIMEN | 1 | BALANCE | 3 | 10 | — | — | — | 5 | 2.0 |
| | 2 | BALANCE | 5 | 10 | — | — | — | 9 | 1.1 |
| | 3 | BALANCE | 3 | 5 | — | — | — | 5 | 3.0 |
| | 4 | BALANCE | 3 | 5 | 10 | — | — | 5 | 1.2 |
| | 5 | BALANCE | 3 | 10 | 5 | — | — | 4.5 | 1.3 |
| | 6 | BALANCE | 1 | 10 | 5 | — | — | 1.0 | 3.3 |
| | 7 | BALANCE | 3 | 10 | 9 | — | — | 4.5 | 0.8 |
| | 8 | BALANCE | 3 | 10 | — | — | 5 | 4.5 | 2.6 |
| | 9 | BALANCE | 3 | 10 | — | 2 | 5 | 4 | 2.5 |
| | 10 | BALANCE | 3 | 10 | 5 | 2.5 | 7.5 | 4 | 2.1 |
| | 11 | BALANCE | 3 | 10 | 5 | 2 | — | 4.5 | 1.8 |
| | 12 | BALANCE | 3 | 10 | 5 | — | 5 | 4.5 | 1.8 |

Note: Symbol "*" means "PLATED".

It can be understood from Table 1 that the invention specimens are by far more excellent in corrosion resistance than the comparative specimens. The comparative specimens 2 and 5 each including a nickel plating layer between the bearing alloy layer and the overlay are extremely inferior in corrosion resistance. The inventors have recognized that this is because Sn and In in the overlay did not diffuse into the bearing alloy layer at all. On the other hand, in the comparative specimens 1, 3 and 4 each of which does not include a nickel plating layer between the bearing alloy layer and the overlay, a copper-zinc alloy layer is not formed between the bearing alloy layer and the overlay because the overlay does not contain Zn.

Therefore, in the comparative specimens 1, 3 and 4, Sn and In in the overlay are expected to diffuse into the bearing alloy layer. However, the comparative specimens 1, 3 and 4 are extremely inferior in corrosion resistance to the invention specimens. The inventors have recognized that this is because Sn and In in the overlay diffuse into the copper matrix of the bearing alloy layer and most of them produce compounds on the interface with Cu so that amounts of Sn and In in the lead phase of the bearing alloy layer are small.

It can be understood from this fact that the corrosion resistance is improved highly effectively in the invention specimens in which Sn and In do not produce compounds with Cu and large amounts of Sn and In remain in the lead phase.

In the comparative specimen 6, the overlay includes a slight amount of Zn, and consequently, a copper-zinc alloy layer is formed during heat treatment at 200° C. for four hours. However, the copper-zinc alloy layer is extremely thin and the thickness is as small as 0.3 μm. Therefore, the effect of preventing Sn and In in the overlay from diffusing into the copper matrix of the bearing alloy layer is so low that substantially the same corrosion resistance as the invention specimens can not be obtained. This can be regarded as a proof for proving that the copper-zinc alloy layer 11 must have a thickness not less than 0.5 μm. It was confirmed in different tests that when the thickness of the copper-zinc alloy layer 11 exceeds 10 μm, the copper-zinc alloy layer 11 becomes brittle, thereby deteriorating bonding strength of the overlay 9.

According to the present invention, as described heretofore, the following effects can be produced:

(a) The copper-zinc alloy layer having a thickness of 0.5 to 10 μm is formed between the copper matrix of the bearing alloy layer and the overlay so that elements in the overlay for improving corrosion resistance and wear resistance, such as Sn and In, can be prevented from diffusing into the copper matrix of the bearing alloy, to thereby improve the corrosion resistance and wear resistance. Moreover, Pb which crystallizes in the copper matrix of the bearing alloy layer is not covered with the copper-zinc alloy layer on the interface with the overlay, and Sn and In in the overlay partially diffuse into this Pb. Therefore, even if the overlay wears and the copper-zinc alloy layer and the bearing alloy layer are exposed, the corrosion resistance and the wear resistance can be maintained by the lead phase in which Sn and In are diffused. Also, there is no fear of damaging the mating shaft and degrading the corrosion resistance of the bearing alloy layer.

(b) The lead alloy overlay consists essentially of, by weight, 1 to 5% Zn, 3 to 25% of at least one of Sn and In, and balance of Pb and incidental impurities, so that the conformability, wear resistance and corrosion resistance can be improved, and also that the effective copper-zinc alloy layer can be formed between the overlay and the copper matrix of the bearing alloy layer.

(c) When the lead alloy overlay further includes 1 to 13% of at least one of Cu and Sb, the wear resistance, corrosion resistance and fatigue resistance can be enhanced even further.

(d) The bearing alloy layer consists essentially of, by weight, 3 to 35% Pb, up to 15% Sn, and balance of Cu and incidental impurities, so that the fatigue resistance, wear resistance and anti-seizure resistance as a bearing for high-load application are excellent.

(e) The copper-lead-system or lead-bronze-system bearing alloy layer is formed on the steel plate optionally plated with Cu, thereby obtaining the bimetal plate. The bimetal plate and the lead alloy plate for the overlay which contains Zn are rolled to bond so that the accumulative reduction will be 8 to 48%, and thereafter subjected to heat treatment at 170° to 250° C. In consequence, the copper-zinc alloy layer can be easily formed between the copper matrix of the bearing alloy layer and the overlay owing to the diffusion.

What is claimed is:

1. A material of a multi-layered slide bearing produced by the process comprising:
   providing a steel plate optionally plated with Cu,
   forming a copper-based lining layer of copper-lead-system or lead-bronze-system bearing alloy on the steel plate,
   forming a lead alloy overlay which consists essentially of, by weight, 1 to 5% Zn, 3 to 35% of at least one of Sn and In, and balance of Pb and incidental impurities, on the lining layer,
   heat treating the steel plate having the lining layer and the overlay layer thereon at an elevated temperature sufficient to cause diffusion reaction and thereby forming a copper-zinc alloy layer between said copper-based lining layer and said lead alloy overlay, said diffusion-formed copper-zinc alloy layer having a thickness of 0.5 to 10 μm.

2. A material of a multi-layered slide bearing according to claim 1, wherein said lead alloy overlay further comprises $1\% \leq Cu+Sb \leq 13\%$.

3. A material of a multi-layered slide bearing according to claim 2, wherein said bearing alloy lining layer consists essentially of, by weight, 3 to 35% Pb, up to 15% Sn, and balance of Cu and incidental impurities.

4. A material of a multi-layered slide bearing according to claim 1, wherein said bearing alloy lining layer consists essentially of, by weight, 3 to 35% Pb, up to 15% Sn, and balance of Cu and incidental impurities.

5. A material for a multi-layered slide bearing comprising:
   a steel plate optionally plated with Cu,
   a lining layer of copper-lead-system or lead-bronze-system bearing alloy on the steel plate, said lining layer having a surface of bearing alloy matrix with Pb-phase islands therein, said Pb-phase islands containing at least one of In and Sn,
   a lead alloy overlay containing zinc on said surface of said lining layer, and
   a diffusion-formed copper-zinc alloy layer of thickness 0.5 to 10 μm between said bearing alloy matrix and said lead alloy overlay, with said Pb-phase islands in said surface being in direct contact with said lead alloy overlay without said copper-zinc alloy layer being interposed therebetween.

6. A material for a multi-layered slide bearing according to claim 5, wherein said lead alloy overlay, prior to a heat treatment which causes diffusion of zinc from said overlay to form said copper-zinc alloy, consists essentially of, by weight, 1 to 5% Zn, $3\% \leq Sn+In \leq 25\%$ with $Sn \leq 15\%$ and $In \leq 15\%$, and balance of Pb and incidental impurities.

7. A material of a multi-layered slide bearing according to claim 6, wherein said bearing alloy lining layer, prior to said heat treatment, consists essentially of, by weight, 3 to 35% Pb, up to 15% Sn, and balance of Cu and incidental impurities.

8. A material of a multi-layered slide bearing according to claim 5, wherein said lead alloy overlay, prior to a heat treatment which causes diffusion of zinc from said overlay to form said copper-zinc alloy, further comprises $1\% \leq Cu+Sb \leq 13\%$.

\* \* \* \* \*